United States Patent [19]

Henderson et al.

[11] 4,256,771
[45] Mar. 17, 1981

[54] CONTINUOUS GELATINIZATION PROCESS

[75] Inventors: Gary A. Henderson, Cobourg; William J. C. Thompson, St. Catharines; John T. Thatcher, Mississauga, all of Canada

[73] Assignee: General Foods, Limited, Toronto, Canada

[21] Appl. No.: 957,906

[22] Filed: Nov. 6, 1978
(Under 37 CFR 1.47)

[30] Foreign Application Priority Data

Nov. 7, 1977 [CA] Canada .................................. 290374

[51] Int. Cl.³ ........................... A23L 1/27; C13L 1/08
[52] U.S. Cl. ..................................... 426/250; 127/32; 127/71; 426/511; 426/805
[58] Field of Search ....................... 127/28, 32, 70, 71; 426/510, 511, 578, 250, 805

[56] References Cited

U.S. PATENT DOCUMENTS

| 2,805,966 | 9/1957 | Etheridge | 127/28 X |
| 2,929,748 | 3/1960 | Schwandt | 127/71 |
| 3,067,064 | 12/1962 | Carey | 127/67 |
| 3,133,836 | 5/1964 | Winfrey et al. | 127/71 |
| 3,219,483 | 11/1965 | Goos et al. | 127/28 |
| 3,256,115 | 6/1966 | Stearns et al. | 127/71 X |
| 3,374,096 | 3/1968 | Knoch | 426/578 |

Primary Examiner—Michael S. Marcus
Attorney, Agent, or Firm—Sim & McBurney

[57] ABSTRACT

A starch-containing material is gelatinized in a continuous process by contacting discrete granules of the material with steam under substantial turbulence utilizing a Venturi mixing effect. The water content of the initial turbulent mixture is sufficiently high so as to permit gelatinization at elevated temperature but insufficient to cause formation of an aqueous slurry of the starch-containing material.

5 Claims, 1 Drawing Figure

CONTINUOUS GELATINIZATION PROCESS

FIELD OF INVENTION

The present invention is directed to a process for the gelatinization of a farinaceous, i.e., a starch-containing, material by heating it to above it gelatinization temperature.

BACKGROUND OF THE INVENTION

Numerous teachings may be found in the prior art of causing gelatinization of a starch-containing material in the presence of water by employing steam for heating purposes. Generally, processes for heating the starch-containing material may be considered to be either batch or continuous type. Extrusion cooking may be regarded as one type of continuous gelatinization process while steam injection cooking may be seen as another type.

An example of a batch type process employing a tempered starchy material in a dry state is taught by Carey in U.S. Pat. No. 3,067,064, issued Dec. 4, 1962. The patentee discloses that a dry, free-flowing, starchy material is tempered in the presence of water at a temperature below the gelatinization temperature. Thereafter, a charge of this material is agitated in the presence of steam which brings about the necessary temperature increase to cause gelatinization. Heating times of 3 to 30 minutes are mentioned with optimum times of 5 to 10 minutes considered necessary to bring about the requisite degree of gelatinization.

Numerous patent teachings relate to continuous gelatinization in which it is necessary that the starch-containing material be employed in slurry form or as a high-moisture content feed. The former process is generally employed in steam injection cooking while the latter is frequently used in extrusion cooking. In the former process, steam is injected into the slurry and, in the presence of excess water at the elevated temperatures, the desired gelatinization takes place. Welch, U.S. Pat. No. 2,941,889, issued June 21, 1960, teaches a simple steam injection into a vegetable, such as corn, in the preparation of a cream-style product. Etheridge, U.S. Pat. No. 2,805,966, issued Sept. 10, 1957, and Winfrey et al, U.S. Pat. No. 3,133,836, issued May 19, 1964, both teach similar but different techniques of using a Venturi principle to obtain high turbulence while injecting steam into a slurry of a starch-containing material. Etheridge employs the principle of directly impacting steam radially or perpendicularly into a starch slurry stream on the order of a velocity of several thousand feet per second whereby extremely agitated and turbulent conditions are obtained. Winfrey et al also employ a Venturi principle, but the contact of the starch slurry and steam is essentially transverse to each other at controlled temperatures and a controlled excess of steam.

Another patent which teaches use of an eductor in gelatinization is Knoch, U.S. Pat. No. 3,374,096, issued Mar. 19, 1968. The process as described also requires an excess of water carrier for a starch slurry.

A batch type process, as exemplified by Carey, discussed above, has the advantage in that a slurry need not be employed and that dry granules may be utilized as the starting material. However, a batch type process has the disadvantage that requires extremely long cooking times with large capital investments for equipment when large quantities of the material are prepared.

A continuous type process of starch gelatinization has the advantage in that minimum amount of equipment is necessary and that fast flow rates may be employed. Conventional continuous processes, however, have the disadvantage in that the high moisture content of the gelatinized product prepared from slurries as in the case of a steam injection cooking process or from high-moisture content feed material as in the case of an extrusion cooking process eventually requires extensive drying operations.

SUMMARY AND GENERAL DESCRIPTION OF INVENTION

A continuous process of gelatinization using a Venturi effect to bring about extreme turbulence with temperature elevation of a starch-containing material has now been discovered which overcomes such disadvantages. The starting material introduced into the gelatinization chamber is in a substantially dry state, i.e., it is not in the form of a slurry. The final gelatinized product is discharged from the gelatinization chamber in particulate, discrete form by means of the steam employed to gelatinize it. To bring about the needed temperature elevation, steam is separately injected into the chamber to cause gelatinization under the substantial turbulence and mixing produced by the Venturi.

The starting material in discrete particle form whether finely divided as a flour or as larger granules must, however, have the necessary water content and adequate heat applied so as to cause gelatinization. If insufficient water is present in the total mixture, the requisite gelatinization will not take place and the steam serves merely as a carrier without bringing about the desired effect.

In accordance with the present invention, there is provided a continuous process for gelatinization of a starch-containing material by the use of steam comprising the steps of: (a) continuously feeding a starch-containing material into a mixing chamber; (b) continuously feeding steam into the mixing chamber; (c) mixing the starch-containing material with the steam employing a Venturi effect to cause turbulence and uniform mixing to raise the starch-containing material temperature to a level sufficient for gelatinization under conditions wherein the total water content of inlet steam and the starch-containing material is sufficient to permit gelatinization but insufficient to cause formation of a slurry; and (d) withdrawing a gelatinized starch-containing material from the mixing chamber.

There are two specific embodiments involved in the present invention for introducing the necessary amount of water into the discrete particles of starch-containing material. The first embodiment involves mixing the granules of the starch-containing material with water, the amount of water being from about 1 to about 40% by weight of the granules and insufficient to form a slurry and then further contacting these granules with steam. The second embodiment involves contacting substantially dry granules with wet steam, i.e., steam into which water is injected. During the mixing and substantial turbulence caused by the Venturi, water condenses onto the surface of the granules, which contain only inherent water, to bring about the requisite level of water needed for gelatinization.

The present process has a number of advantages over prior art procedures. Thus, gelatinized material may be formed without having an excess of water, such as is present in conventional slurry gelatinization processes.

As a consequence, the necessity for extensive drying steps of the gelatinized product is avoided. Further, the gelatinization or swelling of the granules may be obtained with a minimum of damage to the granules and to the cell walls. Additionally, by controlling the amount of water available for gelatinization with the starch-containing material, the degree of gelatinization may be controlled more carefully. The process also allows for the continuous gelatinization of starch-containing formulations which are difficult to cook by extrusion methods. Such formulations include, for example, those with a high oil content. Moreover, capital costs are much lower than with other gelatinization methods.

The process of the present invention has other advantages. Thus, it permits the incorporation of various additives into the starch-containing material. For example, dyes, vitamins and/or other edible ingredients may be added to water employed in the process and the gelatinized material will have the additives uniformly present therein. The process further reduces the degradation of ungelatinized and gelatinized materials within the system since the hold-up time of the starch-containing material in the system is very low as compared to other gelatinization methods, for example, extrusion cooking and the like.

This invention provides a continuous process for gelatinization of a starch-containing material without the need of forming a slurry and the obtaining of a final gelatinized product in a substantially dry state (i.e., 10 to 40% moisture content). Additionally, discrete, gelatinized granules may be formed with minimum rupturing of cell structure even though turbulent conditions are employed.

Although water is present naturally bound in a starch-containing material, ordinarily this amount of water is insufficient to permit any degree of gelatinization. Thus, in a continuous process wherein steam is mixed under turbulent conditions with a starch material, the water content of the material is insufficient to cause significant gelatinization. Therefore, the prior art continuous gelatinization processes employing injectors and/or eductors have employed an excess of liquid water and have found it necessary to introduce the starch-containing material in the form of a slurry.

In one specific embodiment of the present invention, it has been discovered that the necessary added water may be introduced into the starch-containing particles before or during gelatinization while at the same time conveying the particles in a steam stream containing the particles in their discrete form. Water may be introduced before gelatinization by allowing water to penetrate the outer particle cell walls by contacting or mixing with water so as to provide the total quantity of water necessary for gelatinization.

The second specific embodiment of introducing added water necessary to provide gelatinization at an elevated temperature is by the use of wet steam, which under the process parameters allows water to penetrate the surface of the discrete particles so that sufficient water is present to bring about the requisite degree of gelatinization. In this technique, the starch-containing particles, which are in a dry state, i.e., they contain only inherent moisture, are conveyed in an air stream to the gelatinization zone.

It is desirable to define what is meant by the expression "added water" as employed herein. Added water is denoted to mean that sufficient water is present in the total system and is available to bring about gelatinization under the operating conditions of the present invention. In other words, if added water is not present, the total amount of water in the system is insufficient in order to bring about the desired gelatinization. The added water may be introduced into the starch-containing material prior to heating to gelatinize the material, or it may be introduced into the starch-containing material from wet steam during heating of the starch-containing material employing Venturi mixing. A combination of either technique may also, of course, be used.

It should be noted that although the amount of water employed in the process of the present invention controls to a large extent, the gelatinization or degree of cooking of the starch-containing material, gelatinization is also controlled by the back pressure at the discharge end of the mixing chamber where gelatinization takes place. In this connection, the back pressure may be regulated by any of the various means including, for example, providing a gate valve at the discharge end. A thermometer placed prior to the valve provides good measurement of gelatinization conditions within the system.

In the continuous process of this invention, it has been found that turbulence and rapid mixing conditions are necessary to bring about the rapid temperature rise of the starch-containing material and to achieve moisture transfer. While gelatinization in the presence of added water would take place with steam injection and long mixing times, such a system does not provide the processing flexibility possible with the present invention. Since the process of this invention is continuous, it is essential that instantaneous mixing with continued turbulence take place to optimize contact times and throughput.

DESCRIPTION OF PREFERRED EMBODIMENT

Figure 1:
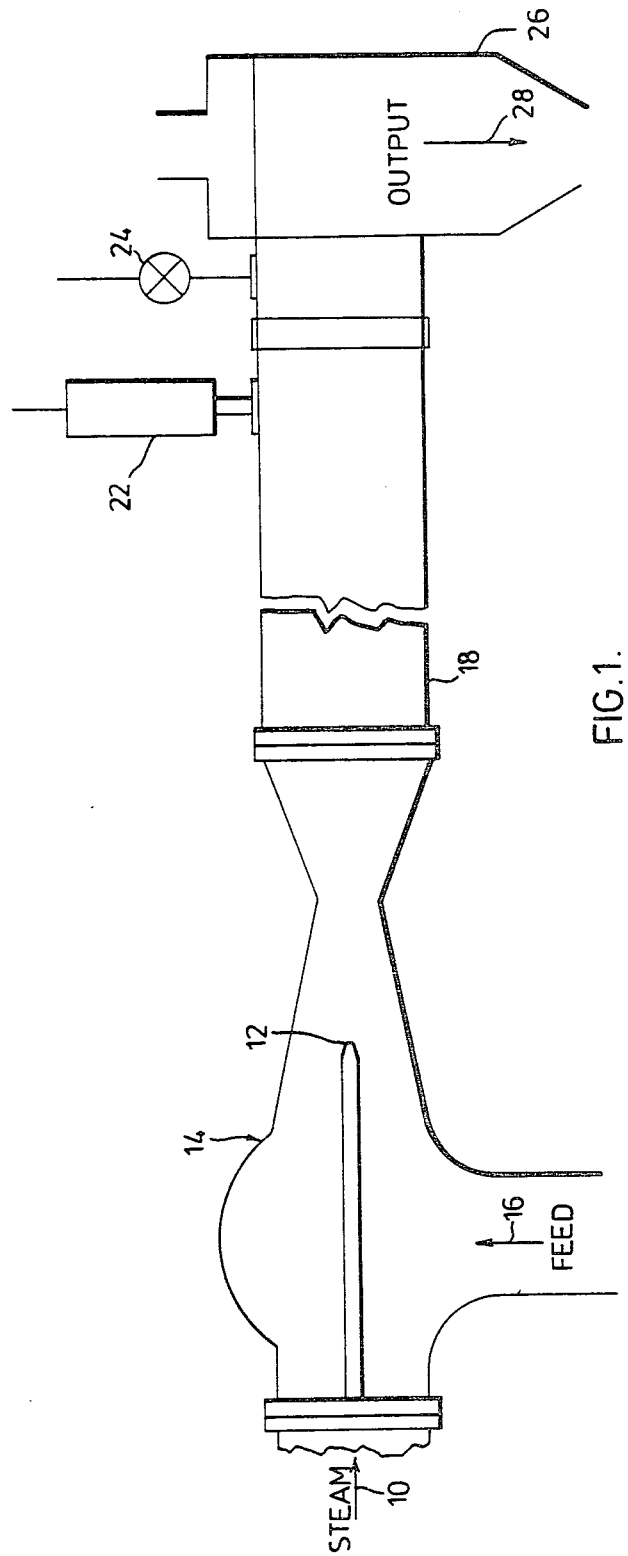
FIG. 1 is a schematic representation of an apparatus useful for carrying out the process of the invention.

The type of mixing and turbulence necessary in the process is one produced by use of a Venturi nozzle. Such Venturi nozzle mixing devices are well-known in the art and, as previously mentioned, have been employed in gelatinization of slurries. A suitable illustrative example of apparatus suitable for the present technique is that shown in the drawing. As illustrated therein, wet steam is fed by line 10 to the throat 12 of a venturi mixer 14. Dry particulate starch material is fed to the venturi mixer 14 by line 16 upstream of the throat 12.

A mixing chamber in the form of a pressure tube 18 is provided downstream of the venturi mixer. The pressure tube 18 has a thermometer 22. A regulator valve 24 releases the gelatinized starch from the pressure tube 18 into a chamber 26 from which the gelatinized starch passes to a collection system. While the technique described above is preferred in the present invention, the relative positions of the steam inlet 10 and inlet 16 for the starch-containing material may be reversed.

The starch-containing material may be introduced into the venturi 14 by any of a number of various systems for air conveying including, for example, a vibrating or auger feeder, a micro mill and a pin and disc mill. A Venturi type mixing nozzle 14 has been found to be essential to produce the highly turbulent state that is necessary to produce the essentially instantaneous contact of the steam with the outside of all the particles or granules of the starch-containing material. The use of a venturi nozzle 14 provides for the highly turbulent state necessary to produce the rapid heat transfer and, if necessary, a transfer of water from wet steam into the starch-containing granules.

The size of the Venturi nozzle 14 may be varied as may the size of the mixing chamber 18. The elongated tube 18 has a length and diameter such as to permit adequate hold-up times for mixing and gelatinization to take place.

In the first embodiment of the invention, water may be introduced into the starch-containing material in accordance to the technique shown in Carey, U.S. Pat. No. 3,067,064, prior to gelatinization. In this technique, the starch-containing materials are tempered by the addition of water at elevated temperatures but below the gelatinization temperature of starch which is about 160° F. Hot water is preferred since it ordinarily increases diffusion rates. With the necessary amount of added water present in the starch-containing material, any type of steam, either wet, saturated or super-heated, depending upon the moisture content desired in the final gelatinized product, may be employed in the Venturi mixing nozzle to cause continuous gelatinization.

In the second embodiment of the invention, the starch-containing material will have insufficient water to cause gelatinization since added water has not been introduced. In this case, additional water is necessary and may be supplied from wet steam during the temperature elevation to gelatinization conditions.

The starch-containing material employed in this invention may range from coarse granules to fine flours. Although the particle size of the material is not absolutely critical, as a practical matter, the use of extremely large granules will limit the degree of total gelatinization since the temperature rise of the innermost section of the granule would be the slowest.

The sources of the starch-containing material are varied. A wide variety of such materials including raw starches, such as, corn, wheat, potato, tapioca and rice; flours, such as corn, wheat and rice flour; meals, such as, animal feeds; and other starch-containing formulations, such as, oil-containing pastry mixes, may be advantageously processed.

EXAMPLES

EXAMPLE 1

A Venturi mixing chamber (with a 1½ in. Venturi nozzle) similar to that shown in Knoch, U.S. Pat. No. 3,374,096, was used. A tube with a diameter of 3 in. and a length of 8 ft. was employed so as to provide sufficient mixing time. Corn flour was employed as the starch-containing material at a feed rate of approximately 200 to 300 lbs/hr.

Wet steam, at a pressure of 20 psi, was employed and fed into the mixing chamber. Water was dispersed into the steam by means of a metering pump prior to the Venturi nozzle. Turbulent mixing in the steam eductor throat allowed sufficient heat transfer so that the temperature necessary for gelatinization was achieved. The temperature at the end of the tube was 210° F. as indicated by a thermometer. The gelatinized corn flour was continuously discharged from the end of the tube by means of the flow of steam employed for gelatinization. The moisture content of the gelatinized corn flour product was 40% by weight, and the percentage of gelatinization as measured by Maltese Cross determination was in excess of 60%.

EXAMPLE 2

This Example illustrates the application of the invention to the gelatinization of oil-containing pastry products which are difficult to gelatinize by other continuous gelatinization methods (e.g., extrusion).

A mix containing 58 part wheat flour, 4.5 parts hydrogenated vegetable oil, 3 parts sugar, 1.25 parts salt and 1.34 parts nonfat dry milk solids was prepared. Equipment used was a 1½ in. Venturi nozzle connected to an 8 ft. tube (3 in. diameter), operated at 20 psi steam with no back pressure. Water was pumped into the steam prior to entry into the nozzle to accurately control the degree of moisture of the final product and hence the degree of cook. Feed rate was 28 lb/hr. The valve at the end of the tube also was used to control the degree of gelatinization by increasing the temperature. As the valve was closed, the operating temperature of the tube increased and the gelatinization increased.

The product, upon analysis showed:

% Moisture (of finished product): 40

% Gelatinization (by Maltese Cross determination): >75

% "Solids"*: 4.0

*Methods in Carbohydrate Chemistry Vol. IV. Starch, ed. R. L. Whistler Pg. 106, T. J. Schoch After being gelatinized as above, the product was cold formed in an extruder into the required shape.

EXAMPLE 3

The process of Example 2 is repeated except that water was added directly to the mix prior to gelatinization at a 30% water level. In this case, less water in the steam was used to produce a finished product moisture of 33–40%. A similar degree of gelatinization was obtained.

EXAMPLE 4

The process of Example 3 is repeated in all essential respect except that 1.0 gm. of a food grade colour/dye blend was dissolved in 14 lbs. of water and the water colour solution was pumped into the steam line prior to the Venturi nozzle at such a rate that the resulting gelatinized product had a moisture content of 39%. A similar degree of gelatinization was obtained and the product had a golden brown "cooked" colour.

EXAMPLE 5

A dry dog food was gelatinized with a Venturi mixing chamber to the same level as in a conventional extrusion process. Conditions utilized involved the use of 80 psi steam and 1 in. Venturi nozzle, the nozzle being connected to an 8 ft. tube (1 in. diameter). A thermometer placed near the end of the tube indicated an operating temperature of 230°–235° F. Analyses of the product indicated a Maltese Cross count equal to that of product gelatinized by a conventional extrusion process.

SUMMARY OF DISCLOSURE

In summary of the disclosure, the present invention is directed to a continuous gelatinization procedure for starch materials which has advantages not exhibited by the prior art.

While the foregoing invention has been described in conjunction with certain preferred embodiments, it is to be understood that the invention is not to be restricted thereto but is to be construed broadly and to be limited only by the following appended claims.

What we claim is:

1. A continuous process for gelatinization of a starch-containing material by the use of steam, comprising the steps of:
   (a) continuously directly feeding a particulate starch-containing material in a substantially free-flowing state into a mixing chamber;
   (b) continuously and separately directly feeding wet steam into said mixing chamber, said wet steam providing water to said mixing chamber in an amount sufficient to permit gelatinization of said starch-containing material but insufficient to cause the formation of a slurry of said starch-containing material in said process;
   (c) mixing said starch-containing material with the wet steam employing a venturi effect to cause turbulence and uniform mixing to raise said starch-containing material temperature to a level sufficient for gelatinization; and
   (d) withdrawing a substantially dry gelatinized particulate starch-containing material from said mixing chamber.

2. The process of claim 1 wherein said starch-containing material comprises corn flour.

3. The process of claim 1 wherein said starch-containing material comprises an animal feed.

4. The process of claim 1 wherein said starch-containing material comprises an oil-containing pastry mix.

5. The process of claim 4 wherein an edible color is added to said water.